United States Patent Office 3,238,159
Patented Mar. 1, 1966

3,238,159
AQUEOUS DISPERSIONS OF COPOLYMERS OF ALKYL HALF ESTERS OF ITACONIC ACID WITH MINERAL PIGMENTS
Paul E. Di Benedetti, Newton, and Norwin W. Wolff, Cambridge, Mass., assignors to A. E. Staley Manufacturing Company, Decatur, Ill., a corporation of Delaware
No Drawing. Filed Oct. 29, 1962, Ser. No. 233,940
22 Claims. (Cl. 260—17.4)

This invention relates to coating adhesives based on novel emulsion copolymers of alkyl esters of alpha, beta-ethylenically unsaturated monocarboxylic acids and monoalkyl esters of itaconic acid. More specifically this invention relates to the use of these copolymers as coating adhesives for pigments in the paper coating industry, wherein said emulsion copolymers are in solution in the aqueous paper coating color.

Coating adhesives exert a tremendous influence on the properties of both the coating composition and the final coated paper. The adhesive in the pigment coating (1) serves as a carrier for the pigment; (2) imparts the proper flow characteristics (for example, viscosity) to the coating composition (or color); (3) serves as a binder for the pigment particles in the dried coating; (4) binds the pigment particles to the base; (5) controls the absorption of printing ink during printing of the coated paper. One of the most important properties of the coating adhesive is the pigment bonding strength, since this property determines the amount of adhesive necessary to hold the pigment on the paper. Each grade of coated paper has a definite strength requirement, and the amount of adhesive necessary in the coating mixture to meet this requirement is determined by the pigment bonding strength of the adhesive. The higher the pigment bonding strength of the adhesive, the higher the ratio of pigment to adhesive that is possible and the better the opacity, brightness and gloss of the paper. If the ratio of adhesive to pigment is too high, the quality of the paper is poor.

Polymeric esters of alpha, beta-ethylenically unsaturated monocarboxylic acids, which are generally water-insoluble and dilute alkali-insoluble, have been widely used as coating adhesives because of their high pigment bonding strength. Usually polymers produced by aqueous emulsion polymerization have been used in preference to polymers produced by solution polymerization, etc. The aqueous emulsion polymers have many advantages over comparable polymers of the same molecular weight prepared by the polymerization of the same monomers in organic solution. The advantages can be classified into three main categories: (1) the low viscosity of the aqueous emulsion polymers at high total solids, (2) processing advantages inherent in emulsion polymerization and (3) the use of water as the polymerization and the coating medium for the polymeric materials. While both types of polymers can be prepared by the direct polymerization of the desired monomeric material, and then compounded with paper coating pigment, aqueous emulsion polymers can be prepared at a much higher total solids concentration due to the fact that polymer solutions are considerably more viscous than aqueous polymer emulsions at the same total solids concentration. (See An Introduction to the Organic Chemistry of High Polymers by Marvel, pages 37–38, 1959, John Wiley & Co., and British Patent No. 703,005.) The lower viscosity of the emulsion polymers permits the shipment of these polymeric materials at a much higher total solids concentration, thereby lowering shipping costs, an appreciable factor. Further, modern high-speed coating machines can only operate at peak efficiency when a coating color is used having a low viscosity at high total solids. For example, present day coating colors (at about 20–70% by weight total solids) are generally applied by brush, air jet, doctor blade or roller coater at viscosities within the range of roughly 50 to 25,000 centipoises, depending upon the type of coating machine used, the place of application, the type of paper to which it is applied, percent solids and the amount of the coating which it is desired to apply.

While the viscosity of polymeric materials produced in organic solution can be minimized to some extent by producing polymers of decidely lower molecular weight, this is usually not desirable because desirable properties (tensile strength and/or elongation, etc.) are often lost when the molecular weight is low.

Polymerizations carried out in organic solution are considerably slower than polymerizations carried out in aqueous emulsion and the polymerizations tend to terminate with substantial proportions of unreacted monomer and/or low polymers (dimers, trimers, etc.). Further, organic solvents (1) generally tend to act as chain transfer agents resulting in lower molecular weight polymers and/or telomers; (2) are hazardous due to toxicity and/or flammability of their vapors, etc.; and (3) are considerably more expensive than water.

While the aqueous emulsion polymers have all of the foregoing advantages, polymers in solution have other advantages. Polymers deposited from solution usually coat larger areas weight-for-weight and have a higher tensile strength than the same polymers deposited from emulsion. Coating colors based on solution polymers can be used to prepare lighter weight papers having the same or better gloss than coating colors based on emulsion polymers. Further, polymeric solutions and coating colors based thereon are much more stable than polymeric emulsions and coating colors based thereon. For example, heat and various salts tend to break emulsions by coagulating the polymeric material. Generally, coating colors based on emulsion polymers have to be applied at relatively low temperatures and can not be applied hot at the calender stack. When coating colors, based on emulsion polymers, have been tried in hot application at the calender stack (about 140–190° F.), the coated paper has a scum of coagulated polymer. Accordingly, polyvinyl alcohol is usually used in calender stack coating colors instead of emulsion copolymers. On the other hand, coating colors based on solution polymers can be applied hot at the calender stack without any possibility of breaking an emulsion.

Another serious problem is the tendency of polymeric emulsions to be broken by freezing and thawing, thereby complicating the shipping and storage of polymeric emulsions during the winter months. Generally, once the emulsion is broken, it cannot be reconstituted without first dissolving the polymeric material in an organic solvent.

As pointed out above, high molecular weight polymers of alkyl esters of alpha, beta-ethylenically unsaturated monocarboxylic acids are generally water-insoluble and dilute-alkali insoluble. However, some of these polymers can be rendered alkali soluble by the partial hydrolysis of a substantial number of ester groups and/or by the copolymerization of the alkyl esters of alpha, beta-ethylenically unsaturated monocarboxylic acids with monomers such as acrylic acid and/or methacrylic acid (see U.S. Patent 3,026,281). Unfortunately, at a comparable molecular weight, these polymers are extremely viscous at low total solids concentration. For example, at a pH of about 8.2 Hycryl A–1000, which is an aqueous ammoniacal solution of a partially hydrolyzed polymer of an ester of acrylic acid, has a viscosity of from about 18,000 to 30,000 centipoises (cps.) at 6–7% by weight total solids. Such polymers are generally unsuitable for use as a coating adhesive for pigments in the paper coating industry. It has generally been considered that any modification to lower the viscosity of a polymeric solution also lessens the adhesive value of the polymer.

The general object of this invention is to provide an aqueous paper coating color comprising as its principal dry components a major proportion of a mineral pigments and a minor proportion of a dispersion of an emulsion copolymer of an alkyl ester of an alpha, beta-ethylenically unsaturated monocarboxylic acid and a monoalkyl ester of itaconic acid.

A principal object of this invention is to provide a paper coating color as defined above wherein said dispersed emulsion copolymer is dissolved in the aqeous phase of said paper coating color.

Another object of this invention is to provide paper coating colors which can be applied at the calender stack.

It has been found that high molecular weight copolymers of alkyl esters of alpha, beta-ethylenically unsaturated monocarboxylic acid and monoalkyl esters of itaconic acid having molecular weights of approxmiately 10,000 to 150,000 or higher, and preferably in excess of 25,000, can be prepared by aqueous emulsion polymerization techniques having the unexpected property of dissolving in dilute aqueous alkali to form polymeric solutions having an extremely low viscosity for their total solids concentration, we have found that these copolymers are extremely useful as pigment adhesive. When dissolved in aqueous ammonia, these polymers have viscosities of less than about 1,000 cps. (usually less than 300 cps.) at 25% total solids at a pH of about 8.2 in contrast to Hycryl A–1000's viscosity of 18,000 to 30,000 cps. at 6–7% total solids. The extremely low viscosity of these copolymers is particularly striking since it is well known that aqueous alkaline solutions of high molecular weight polymers containing carboxylic acid groups are extremely viscous and accordingly they are commonly used as thickening agents to take advantage of their extremely high viscosity, even at low total solids. These copolymers and their physical properties are described in detail and claimed in copending application Serial No. 196,334, filed May 21, 1962.

The coating adhesives of this invention are produced by the aqueous emulsion copolymerization of a monoalkyl ester of itaconic acid and an alkyl ester of an alpha, beta-ethylenically unsaturated monocarboxylic acid. The monoalkyl esters of itaconic acid contain from 1 to 18 carbon atoms in the alkyl group and can be represented by the formula:

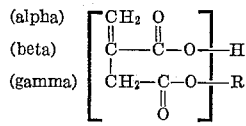

wherein R is a monovalent alkyl group of from 1 to 18 carbon atoms, such as methyl and stearyl. Preferably R is an unsubstituted alkyl group of from 4 to 8 carbon atoms, such as n-butyl, n-hexyl, n-octyl and 2-ethylhexyl. Other things being equal, as the chain length of the alkyl group increases the viscosity of the dissolved polymer in aqueous alkali decreases. Generally, when a lower alkyl ester of itaconic acid, such as the monomethyl ester, is employed it is desirable to employ it in conjunction with a higher monoalkyl ester of itaconic acid. While the above formula indicates that either the beta or gamma carboxyl group can be esterified, best results have been obtained when at least 75% and preferably 90% of the gamma carboxyl groups have been esterified.

While the monoalkyl itaconates can comprise from 5 to 50 mole percent of the polymerizable monomers, it is usually preferably to employ the monomer in a concentration of from about 8 to 20 mole percent. When the copolymer comprises less than about 8 to 10 mole percent monoalkyl itaconate, aqueous alkaline solutions of the copolymer tend to be turbid. Above about 20 mole percent, clay coatings colors based on these copolymers (with casein) tend to be undesirably viscous at high adhesive levels.

The alkyl esters of alpha, beta-ethylenically unsaturated monocarboxylic acids which comprise from about 40 to 95 mole percent of the monomeric units in the copolymers of this invention include "soft" monomers such as methyl acrylate, ethyl acrylate, isopropyl acrylate, butyl acrylate, amyl acrylate, hexyl acrylate, heptyl acrylate, 2-ethylhexyl acrylate, butyl methacrylate, amyl methacrylate, dodecyl methacrylate, etc. and "hard" monomers, such as methyl methacrylate, tert-butyl methacrylate, cyclohexyl acrylate, hydroxyethyl methacrylate, etc., which can be represented by formula

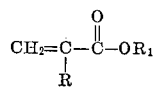

wherein R is methyl or hydrogen; when R is methyl, $R_1$ is an alkyl group of from 1 to 12 carbon atoms and when R is hydrogen, $R_1$ is an alkyl group of from 1 to 8 carbon atoms. The term "soft" is used herein in referring to polymers formed from the monomer alone, in the way that is common in this technology. (See Riddle, Acrylic Esters, Reinhold Publishing Co., 1954, pages 58 et seq.; also Patent Number 2,795,564.) Generally, this refers to the "brittle-point" of the polymer, i.e., the temperatureature at which the polymer breaks on flexing. Polymers of the soft alkyl esters of alpha, beta-ethylenically unsaturated monocarboxylic acids of this invention have brittle points below about 20° C. while the hard esters have brittle points above about 20° C.

In general, the alkyl esters are soft monomers in the above formula when R is hydrogen (acrylic acid esters) and $R_1$ is a primary or secondary alkyl group of from 1 to 8 carbon atoms or when R is methyl (methacrylic acid esters) and $R_1$ is a primary or secondary alkyl group of from 4 to 12 carbon atoms. On the other hand, the alkyl esters are hard monomers in the above formula when R is hydrogen and $R_1$ is a tertiary alkyl group or a cycloalkyl group or when R is methyl and $R_1$ is an alkyl group of from 1 to 3 carbon atoms, a tertiary alkyl group or a cycloalkyl group.

Various other dissimilar copolymerizable ethylenically unsaturated comonomers, such as styrene, vinylidene chloride, allyl alcohol, stearyl methacrylate, isoprene, dibutyl itaconate, etc., can comprise up to about 20 to 40 mole percent of the monomeric units in the copolymers of this invention. However, as explained below, this is usually not particularly advantageous.

While the copolymers of this invention can be composed solely of a monoalkyl ester of itaconic acid and a single alkyl ester of an alpha, beta-ethylenically unsaturated monocarboxylic acid, the preferred copolymers of this invention contain at least some soft alkyl ester of an alpha, beta-ethylenically unsaturated monocarboxylic acid and some hard alkyl ester of an alpha, beta-ethylenically unsaturated monocarboxylic acid in addition to the monoalkyl ester of itaconic acid in order to give the copolymers and applied paper coating colors based thereon the proper balance of hardness, freedom from tack, gloss, flexibility, water resistance, etc. These copolymers usually and preferably contain from about 20 to 87 mole percent of a soft alkyl ester (preferably at least some ethylacrylate), from about 5 to 60 mole percent of a hard alkyl ester, and from about 8 to 20 mole percent of a monoalkyl ester of itaconic acid. Other things being equal, as the molar percentage of soft monomer decreases and of hard monomer increases, the copolymer varies from a soft, flexible, somewhat tacky coating material to a hard, tack free, glossy, relatively rigid material. Various products intermediate between these can be formed.

While all or part of the hard alkyl ester of alpha, beta-ethylenically unsaturated monocarboxylic acid in the above preferred 3-component copolymer can be replaced by other hard monomers, such as the monovinyl aromatics (e.g., vinyl toluene, styrene), dimethyl itaconate, acrylonitrile, vinyl chloride, vinylidene chloride, etc., this is usually not desirable. The hard alkyl esters of alpha, beta-ethylenically unsaturated monocarboxylic acids and particularly methyl methacrylate are preferred because they copolymerize more readily with the soft alkyl esters and the preferred monoalkyl esters of itaconic acid under emulsion polymerization conditions and because the resultant copolymer readily dissolves in aqueous alkali to form a water-thin, water-clear solution. Further, it has been found that a small amount of a hard methacrylate in a copolymer based upon a soft acrylate ester eliminates dilatancy which it a problem with copolymers composed solely of a soft acrylate and itaconic acid half-ester. On the other hand, copolymers containing as little as 10 mole percent monovinyl aromatic or vinylidene chloride units form low viscosity solutions in aqueous alkali, but they are turbid, when the preferred concentration of monoalkyl ester of itaconic acid is employed. Generally, as the concentration of oil soluble monomer, such as vinylidene chloride, styrene or isoprene, increases a correspondingly higher concentration of monoalkyl itaconic can be employed in order to minimize this turbidity. Copolymers with acrylonitrile tend to hydrolyze in alkali to form an undesirably yellowish solution with attendant increase in viscosity and water-sensitivity; further, acrylonitrile is very sluggish in its rate of emulsion polymerization with the essential monomers of this invention.

As can be seen from above, incorporating other comonomers in addition to the preferred combination (monoalkyl ester of itaconic acid, soft alkyl ester of alpha, beta-ethylenically unsaturated monocarboxylic acids and/or hard alkyl ester of alpha, beta-ethylenically unsaturated monocarboxylic acids), frequently detracts from the principal advantages of the preferred combination. Some comonomers can be used only in small quantities without seriously affecting the most desirable results obtained with the preferred combination. For example, monoalkyl maleates and monoalkyl fumarates do not polymerize readily under these conditions (some of these monomers are even more sluggish than acrylonitrile); copolymers containing a substantial molar percentage of vinyl acetate units are often extremely water-sensitive because the acetate groups tend to be hydrolyzed at a pH above about 8; copolymers containing more than 2 or 3 mole percent methacrylic acid or acrylic units are considerably more viscous in aqueous alkaline solutions.

On the other hand, some of the dialkyl itaconates can be used advantageously. When water-soluble, solid monobutyl itaconate is employed in this invention, the addition of a small amount of dibutyl itaconate to the monobutyl itaconate (a solid) yields a liquid, more easily handled composition. Other things being equal, the dibutyl itaconate has no ascertainable undesirable side effects on the copolymers of this invention and usually enhances the uniformity of the copolymer itself. Dimethyl itaconate while somewhat slower in its rate of polymerization than methyl methacrylate does not have the undesirable turbidity effect of the oil soluble monomers. Further, its use also cures the dilatancy problem associated with the soft acrylate-itaconic acid half-ester copolymers.

The table following summarizes the permissable and preferred mole percent of the copolymerizable monomers, the total being 100%.

|  | Preferred | Permissible |
|---|---|---|
| Alkyl ester [1] | 80-92 | 40-95 |
| Soft alkyl ester [1] | 20-87 | 0-95 |
| Hard alkyl ester [1] | 5-60 | 0-95 |
| Alkyl half-ester of itaconic acid | 8-20 | 5-50 |
| Dissimilar ethylenically unsaturated monomer | ([2]) | 0-40 |

[1] Of an alpha, beta-ethylenically unsaturated monocarboxylic acid.
[2] Minor quantities.

It is understood that while the above table sets forth the preferred and permissable molar concentrations of the various monomeric materials making up the copolymers of this invention, many compositions falling outside the preferred range form very desirable alkali soluble, high molecular weight copolymers within the permissible range.

Briefly, the aqueous emulsion copolymers of this invention are prepared by forming an aqueous emulsion, adding the monomers to be polymerized and catalysts to the emulsion, followed by polymerizing said monomers.

The emulsifiers, which have been found useful for dispersal or emulsification of the monomer may be chosen from a wide variety of anionic and nonionic surface active agents. Two or more surface active agents are frequently used of one or both types, and it is preferred to use both an anionic and a nonionic in combination. The preferred nonionic surface active agents (alyklphenoxypolyoxyethylene ethanols) are composed of a hydrophobic hydrocarbon portion and a hydrophilic portion. The latter is a chain of 2–120 oxyethylene units while the former has an alkyl group of 4–18 carbon atoms which may be linked to the oxyethylene chain through a phenoxy group. Generally speaking, as the average length of the hydrocarbon chain in the monomer mixture increases, nonionic surface active agents of reduced number of oxyethylene groups should be used, i.e., those of greater oil solubility. Anionic surface active agents are also useful, and it is preferred to include both varieties in the emulsion. The anionic surface active agents normally have a hydrophilic anion and a hydrophobic cation. The same principles guide the selection of the anionic surface active agent. Typical of these useful anionic surface active agents are ammonium or alkali metal (e.g. sodium) salts of alkyl (e.g., lauryl) ether sulfate, ammonium or alkali metal salts of alkyl phenoxy polyoxyethylene ethanol sulfate esters (and similar polyoxyethylene derivatives), tetra sodium salt of N-(1,2-dicarboxyethyl) N-octadecyl sulfosuccinamate (Aerosol 22), alkali metal and ammonium salts of polyelectrolytes, sodium alkyl (e.g., lauryl) sulfate, etc. In large measure, the selection of surface active agent (or agents) for the present copolymers is the same as for prior art emulsion polymerization.

The amount of surface active agent (or agents) required varies primarily with the concentration of monomers to be handled and to a minor extent with the choice of emulsifier, monomers, proportions of monomers and catalysts. Generally, the amount of surface active agent is between 1% and 12% of the total monomer weight and preferably between 1% and 4%. Somewhat the same principles apply in the selection of the amount as is the selection of the surface active agent itself. The proportion must be sufficient to impart the necessary stability, desired rate of polymerization, and particle size.

As polymerization catalysts, there may be used one or more of the peroxidic compounds better known to act as free radical catalysts which have at least some solubility in aqueous solutions of the emulsifier or which are soluble only in the monomer phase. Among the useful catalysts for the present type of copolymerization are the persulfates, including ammonium, sodium and potassium salts, hydrogen peroxide, and the perborates. Also useful are the organic peroxides and hydroperoxides. These include benzoyl peroxide, tertiary butyl hydroperoxide, diisopropyl benzene hydroperoxide, cumene hydro-peroxide, caproyl peroxide, methylethyl ketone peroxide, etc. Other free-radical catalysts are also useful, such as azodiisobutyronitrile and other aliphatic azo compounds of the type having an acylic azo group and an aliphatic carbon atom an each nitrogen, at least one of which is tertiary. In part, the particular combination of monomers governs the selection of the inorganic or organic peroxide catalysts since some monomers respond better to one variety than they do to another.

The amount of peroxidic catalysts required is about proportional to the concentration of monomers used. The usual range is 0.01% to 3% of catalysts with reference to the weight of the monomer mixture. The preferred range is from 0.10 to 1.0% while the range of 0.4–0.8% is usually best. The optimum amount of catalysts is determined in large part by the nature of the particular monomer selected, including impurities which accompany particular monomers.

Frequently, a promoter for the catalysts (sometimes called an "accelerator" or "adjuvant") is used to hasten the reaction at a sufficiently low temperature to avoid coagulation. The promoter may be a reducing agent and together with the peroxidic catalysts is frequently referred to as a "redox system." Many examples of such systems are known and the promoters include ascorbic acid, and soluble sulfites, hydrosulfites, sulfoxalates, thiosulfates, and bisulfites. Particular promoters are exemplified by sodium hydrosulfite, sodium metabisulfites, zinc or sodium formaldehyde sulfoxalate, and calcium bisulfite. Polyvalent metal ions are also used in small concentrations, particularly ferrous ion in the form of ferrous ammonium sulfate at concentrations of a few parts of ferrous ion per million.

The amount of promoter required varies, as is known with the free-radical initiator chosen and with a particular promoter. The emulsifying agent also affects somewhat the amount used as does the particular monomers. At the outside, not more than 3% or less than 0.01% is used in these situations. The preferred range of ascorbic acid is at the low end of this range up to about 0.5% while sulfites are used preferably in an amount of 0.2% to 1%.

Chain transfer agents, such as octyl mercaptan, dodecyl mercaptan and carbon tetrachloride can be used to regulate the molecular weight and/or the flow characteristics of the copolymer.

Copolymerization is best effected below about 95° C. The preferred range is 30° to 70° C., although slightly lower (0° C.) temperatures are permissible. After most of the monomers have been converted to copolymer, temperatures even higher than 95° C. may then be applied. In fact, after most of the monomers have copolymerized, the resulting emulsion copolymer system can be heated to boiling without breaking the emulsion. However, even if the emulsion breaks, this is not serious because the copolymer is later dissolved and breaking the emulsion does not affect the solution characteristics. During copolymerization the temperature can be controlled in part by the rate at which monomers are supplied and polymerized and/or by applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomer or monomers as polymerization proceeds. An advantage of gradual addition of monomers lies in reaching a high solids content with optimum control and with maximum uniformity of product. Additional catalysts or additional components of the redox system may be added as polymerization proceeds, and these can be used to control the speed of reaction to avoid overheating.

A convenient method of carrying out the polymerization utilizing the preceding principles comprises preparing separate premixtures as follows: (I) a catalyst-emulsifier premixture; (II) a first monomer premixture which contains from 5 to 60 weight percent of the monomers to be polymerized; (III) a second monomer premixture which contains the balance of the monomers to be polymerized. In this method of performing the reaction, the catalyst-emulsifier premixture is preferably prepared in warm water (30–50° C.). To this, the first monomer premixture is added and the polymerization is initiated. After the reaction becomes exothermic, the second monomer premixture is added over a time sufficient to permit the temperature to be controlled throughout the reaction. Additional catalyst and/or promoter is added when necessary to maintain the reaction. Finally, the reaction is permitted or forced to go to completion, which is ensured (1) by raising the temperature to about 85° C. and/or (2) by the addition of additional catalyst and/or promoter.

The resulting acidic copolymer emulsion of this invention can be partially neutralized with alkali or dissolved in alkali at a pH of about 7.2–8.0, which is referred to hereon as the "clear point pH." Suitable basic compounds include alkali metal hydroxides such as sodium hydroxide and potassium hydroxide; ammonium hydroxide; amines such as methyl amine, diethyl amine, triethanol amine, tetramethyl ammonium hydroxide; etc. The copolymers may be shipped in the unneutralized form or as partially neutralized emulsion or as an aqueous alkaline solution to the paper coater or they can be formulated with other ingredients of the coating composition immediately after the copolymerization and shipped as such.

Laboratory printability tests, as measured on an I. G. T. Printability Tester, indicate that pigmented paper coatings containing the pigment adhesives of this invention as the sole pigment adhesive are superior to similar coatings made with higher adhesive levels of starch binders, protein binders, etc. When employed as the sole adhesive in such coatings, the copolymers of this invention can comprise from about 5 to 30 parts per 100 parts of mineral pigment (clay, titanium dioxide, etc.). If desired, concentrations as low as 1 or 2 parts per 100 parts of mineral pigment can be used where the copolymer of this invention replaces part of the conventional pigment binder such as starch, acrylic copolymers, vinyl actate lactices, butadiene-styrene lactices, casein, calcium caseinate, soybean protein, etc. The conventional pigment binder may be considered a diluent of the copolymer of this invention.

Any of the conventional mineral pigments used in manufacturing paper can be used. Representative pigments are clay, titanium dioxide, precipitated calcium carbonate, barium sulfate, calcium sulfide, satin white, zinc pigments and lithopone. The pigment can comprise from about 15% to 65% by weight of the coating color.

The coating colors are prepared by the usual procedures employed in the paper industry with emulsion polymers except that the pigment adhesive may be employed in the emulsion form or the solution form depending on the pH of the coating color. Broadly, the three methods most applicable to the emulsion polymers of this invention are: adding dry pigment to an aqueous solution of the emulsion copolymer, which has been prepared at a total solids of from 20–30% by dissolving the emulsion copolymer in base; adding the adhesive to a pigment suspension, for example to a clay slip of about 70% total solids, and then adding sufficient base to the coating color to dissolve the emulsion copolymer; and preparing a pigment dispersion at about 50–80% total solids and a separate aqueous solution of dissolved emulsion copolymer at about 20–30% total solids, and then blending the pigment dispersion and dissolved pigment adhesive in the desired proportions. The pigment adhesive can be maintained in the emulsion state by maintaining the coating color at a pH below the clear point of the emulsion copolymer.

Various dispersing agents, such as sodium hexametaphosphate (Calgon), crystalline and glassy sodium polyphosphates, crystalline and amorphous sodium silicate, sodium salts of lignin sulphonic acids, sodium salts of alkylaryl sulphonic acids, etc., at a concentration of from about 0.1 to about 1% by weight of the pigment may be used to disperse the pigment in water. The weight percent of the dispersing agent used is not critical, especially since pigments are often supplied to the paper industry with dispersing agents distributed throughout the pigment. Soaps (metal or ammonium salts of fatty acids having from 8 to 18 carbon atoms), such as sodium stearate, potassium stearate and ammonium stearate, may be added to the coating color, if desired, as lubricants in order to prevent feathering or to give the paper added gloss. Various water soluble cross-linking agents, such as Unox 201, Unox 206, MAPO and MAPS, may be added to the coating color, if desired, in order to increase the water-resistance of the applied coating color.

The following examples are merely illustrative and should not be construed as limiting the scope of the invention. In the examples which follow, the word "parts" refers to parts by weight. Unless stated to the contrary, the viscosities of the various copolymers and coating colors were measured with a Brookfield Viscometer using a #2 spindle.

An I.G.T. printability test is referred to in some of the examples. In this test, a film of ink (of a selected degree of tack) of known thickness is transferred to the surface of a printing disc. A strip of paper to be tested is clamped at one end onto a sector of a cylinder with a backing strip clamped at one end of the sector. Then the paper is brought into contact with the inked disc. While the disc is held against the paper strip under a constant pressure, the sector is caused to rotate by a spring-drive device. The speed at which any point on the cylinder sector passes the point of contact with the disc has been calibrated so that the velocity can be read from the calibration chart. When picking of coating or sheet surface occurs, one can read from the chart the printing velocity at the point of picking. The higher this number and the more viscous (or tacky) the ink, the greater is the picking resistance of the test sheet. A #2 IPI ink and B spring were used in the examples that follows.

*Example I*

The following premixtures were prepared to be used in the preparation of a copolymer of this invention.

| | Parts (dry weight) |
|---|---|
| Catalyst-emulsifier premixture: | |
|     Duponol WAQE | 1.8 |
|     Tergitol NPX | 1.2 |
|     Tertiary butyl hydroperoxide | 0.6 |
|     Water | 170 |
| First monomer premixture: | |
|     Monobutyl itaconate* | 5.4 |
|     Ethyl acrylate | 15.6 |
|     Methyl methacrylate | 9.0 |
|     Tertiary dodecyl mercaptan | 0.12 |
| Second monomer premixture: | |
|     Monobutyl itaconate | 12.6 |
|     Ethyl acrylate | 36.4 |
|     Methyl methacrylate | 21.0 |
|     Tertiary dodecyl mercaptan | 0.28 |
| Promoter: | |
|     Ascorbic acid | 0.25 |
|     Water | 10 |
| Additional catalyst: | |
|     Tertiary butyl hydroperoxide | 0.15 |

*The monobutyl itaconate used in this example and in the examples to follow has approximately 90% of the gamma carboxyl groups esterified. Unless specified the monoalkyl itaconate in the examples has this ratio of beta and gamma carboxyl groups.

Six parts (1.8 parts dry weight) of aqueous Duponol WAQE (sodium salt of technical lauryl alcohol sulfate) and 1.2 parts dry weight of Tergitol NPX (alkylphenyl ether of polyethylene glycol) were dissolved at 30° C. in 170 parts water in a suitable glass-lined reactor fitted with a stirrer, jacket and nitrogen inlet tube. After the reactor was purged with nitrogen gas 0.60 part of tertiary butyl hydroperoxide and 2.5 parts (0.0625 part dry weight) of an aqueous solution of ascorbic acid were added. The first monomer premixture was then added to the reactor. After the reaction was initiated, which was indicated by a 1 to 2° C. rise in temperature, the second monomer premixture and the remaining ascorbic acid was added gradually over a period of about 1 hour and 2 hours respectively. After all of the second monomer premixture was added, the additional catalyst was added and the temperature of the reactor was held at about 70–75° C. until the polymerization was complete. The emulsion (36% by weight total solids) was then cooled to room temperature. The copolymer contained 10.6 mole percent monobutyl itaconate, 56.7 mole percent ethyl acrylate and 32.7 mole percent methyl methacrylate.

A low viscosity 25% by weight total solids ammoniacal solution was prepared from the above aqueous emulsion copolymer by slowly adding 1.5 parts 26° Bé. ammonium hydroxide, which was diluted with 7.5 parts water, to 100 parts of the above emulsion copolymer, which had previously been diluted with 35 parts water. The composition was stirred vigorously until clear. A series of 20%, 25% and 30% by weight total solids aqueous ammoniacal solutions was prepared at various pHs in the same manner. The emulsion copolymer of this example (1) has a clear point at a pH of approximately 7.8 in an ammoniacal solution, and (2) a 20% by weight total solids solution has a viscosity below 300 cps. independently of pH.

A low viscosity 20% by weight total solids solution was prepared from the above aqueous emulsion copolymer by slowly adding 4.0 parts of morpholine, which was diluted with 76 parts water, to 100 parts of the above emulsion copolymer. The composition was stirred vigorously until clear. A series of solutions in aqueous morpholine was prepared at various pHs in the same manner. The emulsion copolymer of this example (1) has a clear point at a pH of about 7.8 in aqueous morpholine and (2) a 20% by weight total solids solution has a viscosity below 400 cps. independently of pH.

A low viscosity 20% by weight total solids solution was prepared from the above aqueous emulsion copolymer by slowly adding 86 parts aqueous sodium hydroxide (1.25 parts dry weight) to 100 parts of the above emulsion copolymer. The composition was stirred vigorously until clear. A series of solutions were prepared at various pHs in the same manner. The emulsion copolymer of this example (1) has a clear point at a pH of about 8 in aqueous sodium hydroxide and (2) the viscosity of a 20% by weight total solids solution is below 300 cps. independently of pH.

A 20% by weight aqueous solution was prepared by dissolving 100 parts of the emulsion copolymer (36 parts dry weight) of this example in 100 parts of water containing 4 parts diethanolamine. The solution had a pH of 8.8 and a viscosity less than 100 cps.

A 20% by weight aqueous solution was prepared by dissolving 100 parts of the emulsion copolymer (36 parts dry weight) of this example in 75 parts of water containing 3 parts monoethanolamine. The solution had a pH of 9.6 and a viscosity less than 100 cps.

*Example II*

The following premixtures were prepared to be used in the preparation of a viscosity stable copolymer of this invention.

| Catalyst-Emulsifier Premixture: | Parts (dry weight) |
|---|---|
| Duponol WAQE | 1.8 |
| Tergitol NPX | 1.2 |
| Tertiary butyl hydroperoxide | 0.6 |
| Tertiary dodecyl mercaptan | 0.6 |
| Water | 165 |
| First Monomer Premixture: | |
| Monobutyl itaconate | 3.6 |
| Monomethyl itaconate | 0.4 |
| Ethyl acrylate | 3.0 |
| Methyl methacrylate | 3.0 |
| Methyl acrylate | 10.0 |
| Second Monomer Premixture: | |
| Monobutyl itaconate | 14.4 |
| Monomethyl itaconate | 1.6 |
| Ethyl acrylate | 12.0 |
| Methyl methacrylate | 12.0 |
| Methyl acrylate | 40.0 |
| Promoter: | |
| Ascorbic acid | 0.12 |
| Water | 10 |
| Additional Emulsifier: | |
| Triton X-200 | 0.40 |

Six parts (1.8 parts dry weight) of Duponol WAQE, 1.2 parts dry weight Tergitol NPX, 0.6 part tertiary butyl hydroperoxide and 0.6 part tertiary dodecyl mercaptan were dissolved at 30° C. in 165 parts water in a suitable glass-lined reactor. The first monomer premixture was added to the reactor and then 0.036 part (dry weight) of ascorbic acid was added. The second monomer premixture and the remaining ascorbic acid were added over a period of 1 hour after the initial reaction became exothermic, while maintaining the reaction temperature at about 70° C. Shortly before the end of the second monomer addition, 0.40 part dry weight of Triton X-200 (alkylaryl polyether sodium sulfonate) was added to the reactor. After the polymerization was complete, the emulsion (36% by weight total solids solution) was cooled to room temperature. The copolymer contained 9.7 mole percent monobutyl itaconate, 1.4 mole percent monomethyl itaconate, 15.1 mole percent ethyl acrylate, 15.1 percent methyl methacrylate and 58.6 mole percent methyl acrylate.

A series of 20%, 25% and 30% by weight total solids aqueous ammoniacal solutions were prepared in the manner described in Example I.

The emulsion copolymer of this example (1) has a clear point at a pH of approximately 7.3 in an ammoniacal solution and (2) a 20% by weight total solids solution has a viscosity below 1000 c.p.s. independently of pH.

A series of 20% by weight total solids aqueous solutions were prepared in aqueous sodium hydroxide and in aqueous morpholine. The emulsion copolymer of this example (1) has a clear point at a pH of approximately 7.5 in aqueous sodium hydroxide and (2) a 20% by weight total solids solution has a viscosity below 150 c.p.s. in either aqueous sodium hydroxide or aqueous morpholine independently of pH.

*Example III*

Another copolymer of this invention was prepared by the polymerization technique of Example II using the emulsifier catalyst system of that example except that the monomer premixtures were as follows:

| First Monomer Premixture: | Parts |
|---|---|
| Monobutyl itaconate | 5.4 |
| Ethyl acrylate | 18.6 |
| Methyl methacrylate | 6.0 |
| Second Monomer Premixture: | |
| Monobutyl itaconate | 12.6 |
| Ethyl acrylate | 43.4 |
| Methyl methacrylate | 14.0 |

The resulting emulsion copolymer, which contained 10.6 mole percent monobutyl itaconate, 67.6 mole percent ethyl acrylate and 21.8 mole percent methyl methacrylate, was dissolved in aqueous ammoniacal solutions as described in Example I. The results were essentially the same as with the copolymer of Example I.

Aqueous solutions of the above emulsion copolymer were prepared at 10% and 20% by weight total solids in aqueous sodium hydroxide and aqueous morpholine at pH's up to about 10. All of the solutions has viscosities below 300 c.p.s.

*Example IV*

This example illustrates that the monoalkyl itaconates of this invention cannot be replaced by mnoalkyl esters of alpha, beta-ethylentically unsaturated alpha, beta-dicarboxylic acids. Example II was repeated using the following monomer premixtures.

| First monomer premixture: | Parts |
|---|---|
| Monobutyl maleate | 6.0 |
| Ethyl acrylate | 18.0 |
| Methyl methacrylate | 6.0 |
| Second monomer premixture: | |
| Monobutyl maleate | 14.0 |
| Ethyl acrylate | 42.0 |
| Methyl methacrylate | 14.0 |

The polymerization was quite sluggish and resulted in a very milky high coagulum (6%) emulsion quite different from the low coagulum (less than 0.5%) emulsions of the preceding examples. The copolymer which contained 12.7 mole percent monobutyl maleate, 65.5 mole percent ethyl acrylate and 21.8 mole percent methyl methacrylate, set up and coagulated almost completely when the copolymer at 25% by weight solids was neutralized with the same amount of ammonium hydroxide which was employed in Example III to dissolve the copolymer of Example III at its clear point. On the other hand, a 30% by weight total solids copolymer of Example III formed a water-thin (about 100 c.p.s.) clear point. The above data emphasizes that the monoalkyl itaconates of this invention cannot be replaced by monoalkyl esters of alpha, beta-ethylenically unsaturated alpha, beta-dicarboxylic acids.

*Example V*

This example illustrates that the monoalkyl itaconates of this invention cannot be replaced by an alpha, beta-ethylenically unsaturated monocarboxylic acid. Example II was repeated using 10 parts methacrylic acid, 70 parts ethyl acrylate and 20 parts methyl methacrylate. The copolymer, which contained 11.4 mole percent methacrylic acid, 68.9 mole percent ethyl acrylate and 19.7 mole percent methyl methacrylate, was dissolved in an ammoniacal solution at a pH of 7.75 to form a highly viscous (in excess of 100,000 c.p.s.) cloudy solution at 25% by weight total solids. The viscosity of the polymeric solution did not decrease on aging. This was in direct contrast to the water-thin clear, higher total solids solutions of the copolymers of Example III at the same pH. This example clearly illustrates that the monoalkyl itaconates of this invention cannot be replaced by alpha, beta-ethylenically unsaturated monocarboxylic acids.

Example VI

Another copolymer of this invention was prepared by the polymerization technique of Example II except that the monomer premixtures were as follows:

First monomer premixture: Parts
    Monobutyl itaconate _____ 6.0
    Ethyl acrylate _____ 22.2
    Methyl methacrylate _____ 1.8
Second monomer premixture:
    Monobutyl itaconate _____ 14.0
    Ethyl acrylate _____ 51.8
    Methyl methacrylate _____ 4.2

The resulting emulsion copolymer, which contained 11.8 mole percent monobutyl itaconate, 81.6 mole percent ethyl acrylate and 6.6 mole percent methyl methacrylate, was dissolved in aqueous ammoniacal solutions as described in Example I. The results were essentially the same as in Example I.

Example VII

A copolymer having essentially the same properties as the copolymer of Example VI was prepared using the method described in Example I, except that the monomer premixtures were as follows:

First monomer premixture: Parts
    Monobutyl itaconate _____ 6.4
    Ethyl acrylate _____ 17.9
    Methyl methacrylate _____ 1.9
    Butyl acrylate _____ 5.7
Second monomer premixture:
    Monobutyl itaconate _____ 13.6
    Ethyl acrylate _____ 38.1
    Methyl methacrylate _____ 4.1
    Butyl acrylate _____ 12.3

The resulting emulsion copolymer, which contained 12.3 mole percent monobutyl itaconate, 64.2 mole percent ethyl acrylate, 16.6 mole percent butyl acrylate and 6.9 mole percent methyl methacrylate, was dissolved in aqueous ammoniacal solutions as described in Example I.

Example VIII

Each of the copolymers of Examples I–III, VI and VII were dissolved at about 20% by weight total solids in an ammoniacal solution and cast as a film. Each of the films was aged 72 hours at 77° F. and 50% relative humidity before testing. The results are set forth below in Table II.

TABLE II

| Property and test | I | II | III | VI | VII |
|---|---|---|---|---|---|
| Tensile strength in p.s.i., ASTM: D882-56T | [1] 3,080 | 3,250 | 1,790 | -------- | -------- |
| Elastic modulus in p.s.i., ASTM: D882-56T | 206,500 | 380,000 | 145,000 | (250) | (250) |
| Percent elongation at break, ASTM: D882-56T | 130 | 110 | 200 | 800+ | 800+ |
| Sward hardness, Plate glass: 50 | 15 | 43 | 14 | 2.5 | 2.5 |
| Wet abrasion [2], Gardner wear tester | 600 | -------- | 2,000+ | 125 | 125 |
| Dry abrasion [3], Taber abraser | 325 | 9.8 | 200 | 125 | 125 |
| Gloss | 90 | 96 | 90 | 88 | 88 |

[1] A film cast from this copolymer in the emulsion form (at an acidic pH) had a tensile strength of 1,750 p.s.i.
[2] Cycles to 50% destruction of 0.002 inch film.
[3] Cycles to 25% destruction of 0.003 inch film.

The above table indicates that by varying the monomer proportions of the copolymers of this invention, it is possible to prepare films varying considerably in physical properties. It might be noted that while methyl acrylate is considered a soft monomer for the purposes of this invention, it is considerably harder than ethyl acrylate and the various other soft acrylates. Accordingly, other things being equal, films based on copolymers having a high concentration of methyl acrylate have a higher tensile strength than those having the same concentration of ethyl acrylate, etc.

Example IX

This example illustrates the preparation of a copolymer having essentially the same aqueous alkaline solution properties and film properties as the copolymer of Example III except that the copolymer contains monomethyl itaconate which serves as a built-in viscosity stabilizer. The copolymer was prepared by the method of Example II using the following monomer premixtures.

First monomer premixture: Parts
    Monobutyl itaconate _____ 2.8
    Monomethyl itaconate _____ 0.4
    Ethyl acrylate _____ 12.6
    Methyl methacrylate _____ 4.2
Second monomer premixture:
    Monobutyl itaconate _____ 11.2
    Monomethyl itaconate _____ 1.6
    Ethyl acrylate _____ 50.4
    Methyl methacrylate _____ 16.8

The copolymer contained 8.1 mole percent monobutyl itaconate, 1.5 mole percent monomethyl itaconate, 67.8 mole percent ethyl acrylate and 22.6 mole percent methyl methacrylate. High viscosity polymeric solutions of this copolymer were stable in viscosity (decreased less than about 20% after aging 24 hours).

Example X

This example illustrates the preparation of a copolymer having essentially the same aqueous alkaline solution properties and film properties as the copolymer of Example I except that the copolymer contains monomethyl itaconate which serves as a built-in viscosity stabilizer. The copolymer was prepared by the method of Example II using the following monomer premixtures.

First monomer premixture: Parts
    Monobutyl itaconate _____ 2.8
    Monomethyl itaconate _____ 0.8
    Ethyl acrylate _____ 10.2
    Methyl methacrylate _____ 6.2
Second monomer premixture:
    Monobutyl itaconate _____ 11.2
    Monomethyl itaconate _____ 3.2
    Ethyl acrylate _____ 40.8
    Methyl methacrylate _____ 24.8

The copolymer contained 8.1 mole percent monobutyl itaconate, 3.0 mole percent monomethyl itaconate, 55.3 mole percent ethyl acrylate and 33.6 mole percent methyl methacrylate. High viscosity polymeric solutions of this copolymer were stable in viscosity (decreased less than about 20% after aging 24 hours).

Example XI

Example I was repeated using a monobutyl itaconate having approximately 50% of the gamma carboxyl groups and 50% of the beta carboxyl groups esterified. This mixed monobutyl itaconate was prepared by the transesterification of itaconic acid and dibutyl itaconate. The polymerization of these monomers was considerably slower than the polymerization in Example I and the resultant copolymer on dissolution in alkali was somewhat hazy. The initial viscosity on dissolution of the copolymer at 25% total solids in aqueous ammonia was also higher than the viscosity of the copolymers of Example I.

Example XII

This example illustrates the preparation of a copolymer of this invention using monohexyl itaconate. The copolymer was prepared by the method of Example I using the following premixtures:

| Emulsifier-catalyst premixture | Parts (dry) |
|---|---|
| Duponol WAQE | 1.25 |
| Tergitol NPX | 1.25 |
| Dibenzoyl peroxide | 0.75 |
| Water | 170 |
| First monomer premixture | |
| Monohexyl itaconate | 7.5 |
| Ethyl acrylate | 15.0 |
| Methyl methacrylate | 7.5 |
| Second monomer premixture | |
| Monohexyl itaconate | 17.5 |
| Ethyl acrylate | 35.0 |
| Methyl methacrylate | 17.5 |
| Promoter | |
| Ascorbic acid | 0.20 |

The resulting emulsion copolymer, which contained 13.5 mole percent monohexyl itaconate, 57.7 mole percent ethyl acrylate and 28.8 mole percent methyl methacrylate, was dissolved at 20% by weight total solids in ammonium hydroxide to form a clear, low viscosity, ammoniacal solution. Films cast from ammoniacal solution had better water resistance than films cast from copolymers containing the same mole concentration of monobutyl itaconate.

Example XIII

This example illustrates the preparation of a copolymer of a monoalkyl itaconate and a single alkyl ester of an alpha, beta-ethylenically unsaturated monocarboxylic acid wherein the monoalkyl itaconate comprises in excess of 40 mole percent of the copolymer. The copolymer was prepared by the method of Example I except that the polymerization temperature was maintained below 35° C. The following concentration of reactants was employed.

| | Parts (dry weight) |
|---|---|
| Monobutyl itaconate | 60 |
| Methyl acrylate | 40 |
| Duponol WAQE | 1.5 |
| Igepal Co-887 (nonylphenoxypolyoxyethylene glycol) | 1.50 |
| Water | 150 |
| Ascorbic acid | 0.15 |
| Tertiary butyl hydroperoxide | 0.30 |

The resulting emulsion copolymer, which contained 41.0 mole percent monobutyl itaconate and 59 mole percent methyl acrylate was dissolved at 20% by weight total solids in ammonium hydroxide to form a clear, low viscosity, ammoniacal solution.

Example XIV

Example XIII was repeated using 50 parts monobutyl itaconate (31.6 mole percent) and 50 parts methyl acrylate (68.4 mole percent). The resulting emulsion copolymer was dissolved at 20% by weight total solids in ammonium hydroxide to form a clear, low viscosity, ammoniacal solution.

Example XV

Example XIII was repeated using 30 parts mono-2-ethylhexyl itaconate (15.9 mole percent) and 70 parts ethyl acrylate (84.1 mole percent). The resulting emulsion copolymer was dissolved at 20% by weight total solids in ammonium hydroxide to form a slightly hazy, low viscosity, ammoniacal solution.

Example XVI

Example XIII was repeated using 20 parts mono-2-ethylhexyl itaconate (9.9 mole percent) and 80 parts ethyl acrylate (90.1 mole percent). The resulting emulsion copolymer was dissolved at 20% by weight total solids in ammonium hydroxide to form a slightly hazy, low viscosity, ammoniacal solution.

Example XVII

This example illustrates the preparation of a copolymer wherein the monoalkyl itaconate comprises less than 6 mole percent of the copolymer. The copolymer was prepared by the method of Example I except that the tertiary butyl perbenzoate was added at the end of the polymerization. The following concentration of reactants was employed.

| | Parts (dry) |
|---|---|
| Monobutyl itaconate | 10.0 |
| Ethyl acrylate | 88.0 |
| Allyl alcohol | 2.0 |
| Tergitol NPX | 0.2 |
| Duponol WAQE | 1.0 |
| Aerosol 22 | 1.0 |
| Igepal CO887 | 1.0 |
| Tertiary butyl hydroperoxide | 0.5 |
| Ascorbic acid | 0.25 |
| Tertiary butyl perbenzoate | 0.20 |
| Water | 150 |

The resulting emulsion copolymer, which contained 5.5 mole percent monobutyl itaconate, 4.3 mole percent allyl alcohol and 90.2 mole percent ethyl acrylate was dissolved at 20% by weight total solids in ammonium hydroxide to form a cloudy, low viscosity ammoniacal system, which was on the border line between an emulsion and a solution.

Example XVIII

This example illustrates the preparation of a three component polymer, wherein dimethyl itaconate is employed as a hard monomer. The copolymer was prepared by the method of Example II using the following reactants.

| | Parts (dry) |
|---|---|
| Monobutyl itaconate | 20 |
| Ethyl acrylate | 35 |
| Dimethyl itaconate | 45 |
| Tertiary dodecyl mercaptan | 0.6 |
| Tergitol NPX | 1.2 |
| Duponol WAQE | 1.8 |
| Triton X-200 | 0.4 |
| Tertiary butyl hydroperoxide | 0.75 |
| Ascorbic acid | 0.12 |
| Water | 180 |

The resulting emulsion copolymer, which contained 14.4 mole percent monobutyl itaconate, 47.2 mole percent ethyl acrylate and 38.4 mole percent dimethyl itaconate, was dissolved at 25% by weight total solids in ammonium hydroxide to form a clear, low viscosity solution.

Example XIX

This example illustrates the preparation of a three component polymer, wherein styrene is employed as a hard monomer. The copolymer was prepared by the method of Example II using the following reactants.

| | Parts (dry) |
|---|---|
| Monobutyl itaconate | 20 |
| Ethyl acrylate | 70 |
| Styrene | 10 |
| Tertiary dodecyl mercaptan | 0.6 |
| Tergitol NPX | 1.2 |
| Duponol WAQE | 1.8 |
| Triton X-200 | 0.4 |
| Tertiary butyl hydroperoxide | 0.75 |
| Ascorbic acid | 0.12 |
| Water | 180 |

The resulting emulsion copolymer, which contained 11.9 mole percent monobutyl itaconate, 10.6 mole percent styrene and 77.5 mole percent ethyl acrylate was dissolved at 25% by weight total solids in amomnium hydroxide to form a hazy low viscosity solution.

Example XX

Example XIX was repeated except that the ethyl acrylate concentration was cut to 60 parts and the styrene was replaced with 20 parts of acrylonitrile. The resulting emulsion copolymer, which contained 10.0 mole percent monobutyl itaconate, 56 mole percent ethyl acrylate and 34 mole percent acrylonitrile, was dissolved at 25% by weight total solids in ammonium hydroxide to form a milky low viscosity solution. The milkiness of the solution was believed to be due to the absorption of water by acrylonitrile units in the copolymer.

Example XXI

Example XIX was repeated except that the styrene was replaced by 10 parts vinylidene chloride. The resulting emulsion copolymer, which contained 11.7 mole percent monobutyl itaconate, 11.3 mole percent vinylidene chloride and 77 mole percent ethyl acrylate, was dissolved at 25% by weight total solids in ammonium hydroxide to form a hazy, low viscosity solution.

Example XXII

Example XIX was repeated except that the ethyl acrylate concentration was cut to 60 parts and the styrene was replaced by 20 parts isoprene. The resulting emulsion copolymer, which contained 10.7 mole percent monobutyl itaconate, 60.0 mole percent ethyl acrylate and 29.4 mole percent isoprene, was dissolved at 25% by weight total solids in ammonium hydroxide to form an almost clear (brownish haze), low viscosity solution.

Example XXIII

This example illustrates the preparation of a copolymer having essentially the same aqueous alkaline solution properties and film properties as the copolymer of Example VI except that the copolymer contains monomethyl itaconate which serves as a built in viscosity stabilizer. The copolymer was prepared by the method in Example II using the following monomer premixtures.

First monomer premixture                Parts
  Monobutyl itaconate _____ 3.0
  Monomethyl itaconate _____ 0.4
  Ethyl acrylate _____ 15.4
  Methyl methacrylate _____ 1.2
Second monomer premixture
  Monobutyl itaconate _____ 12.0
  Monomethyl itaconate _____ 1.6
  Ethyl acrylate _____ 61.6
  Methyl methacrylate _____ 4.8

The copolymer contained 8.7 mole percent monobutyl itaconate, 1.5 mole percent monomethyl itaconate, 83.3 mole percent ethyl acrylate and 6.5 mole percent methyl methacrylate. High viscosity polymeric solutions of this copolymer were stable in viscosity (decreased less than 20% after aging 24 hours).

Example XXIV

This example illustrates the compatability of a typical preferred copolymer of this invention with various types of polymers (water-soluble or emulsion polymers). A series of 20% by weight total solids compositions were prepared at pH 8.6 using the copolymer of Example II in a weight ratio of 4:1 and 1:1 with the second polymer. The results are set forth below in Table III.

TABLE III

| Test material | 4:1 ratio | 1:1 ratio |
|---|---|---|
| Elvanol 52-22 polyvinyl alcohol | Compatible | Compatible. |
| Naugatex 2734-butadiene-styrene latex. | do | Do. |
| Rhoplex AC-55-acrylic emulsion | do | Do. |
| SMA-3000A styrene-maleic anhydride copolymer. | do | Compatible high viscosity. |
| Ubatol U-7001 styrene-acrylic emulsion. | do | Compatible. |
| Stadex 87 dextrin | do | Do. |
| Cascoloid ST-54 casein | do | Compatible high viscosity. |

Example XXV

This example illustrates the preparation of coating colors using an emulsion copolymer of this invention as the pigment adhesive at a 12% level based on the weight of the pigment. A 70 percent clay slip was prepared by adding 100 parts of clay (25 parts Spray Satin Clay and 75 parts HT clay) to 44 parts of water, which contained 0.05 part of sodium hexametaphosphate; the clay was dispersed in water by stirring for one hour. Thirty-three and one-third parts of a 36% by weight aqueous emulsion copolymer was stirred into the clay slip. The coating color, which contained 64% by weight total solids, was then adjusted to pH 8 with concentrated ammonium hydroxide dissolving the emulsion copolymer. After stirring 1.5 hours the resulting paper coating color was applied to a 45 lb. coating raw stock with a #10 wire wrapped rod. The coated sheet was conditioned for 24 hours in a constant humidity room before testing. Samples were also prepared at 9% and 15% by weight pigment adhesive in the same way. The results are set forth in Table IV.

TABLE IV

| Pigment adhesive | Percent by weight adhesive based on weight of clay | Percent total solids | Color viscosity Brookfield in cps. | Color pH | Average IGT |
|---|---|---|---|---|---|
| Copolymer of Example I | 9 | 64 | 126 | 7.9 | 270 |
| Do | 12 | 64 | 184 | 8.1 | 340 |
| Do | 15 | 60 | 202 | 8.0 | 380 |
| Copolymer of Example III | 9 | 64 | 160 | 7.9 | 290 |
| Do | 12 | 64 | 208 | 8.0 | [1] 390 |
| Do | 15 | 60 | 232 | 8.0 | 460 |
| Copolymer of Example VII | 9 | 64 | 214 | 8.0 | 240 |
| Do | 12 | 64 | 216 | 8.0 | 320 |
| Copolymer of Example VI | 15 | 60 | 148 | 8.0 | 430 |

[1] A No. 3 ink was employed.

The above data indicates that pigment adhesives of this invention form excellent low viscosity coating colors, when the dispersed emulsion copolymer is dissolved in the aqueous coating color.

Example XXVI

A series of coating colors were prepared with the emulsion copolymers of Examples I, III and VII by the method employed in Example XXV except that the emulsion copolymers were not dissolved by adjusting the pH of the coating color with ammonium hydroxide. The results are set forth below in Table V.

TABLE V

| Pigment adhesive | Percent by weight adhesive based on weight of clay | Color viscosity, Brookfield in cps. | Color pH | Average IGT |
|---|---|---|---|---|
| Copolymer of Example I | 12 | 86 | 5.5 | 460 |
| Copolymer of Example III | 12 | 90 | 5.7 | 470 |
| Copolymer of Example VII | 12 | 112 | 5.6 | 380 |

The above data indicates that the pigment adhesives of this invention form excellent low viscosity coating colors, when the dispersed emulsion copolymer is not dissolved in the aqueous coating color.

*Example XXVII*

A series of coating colors were prepared with equal parts of starch and dissolved emulsion copolymer in the following manner. A 70 percent clay slip was prepared by adding 100 parts of clay (25 parts Spray Satin Clay and 75 parts HT clay) to 44 parts of water, which contained 0.05 part of sodium hexametaphosphate; the clay was dispersed in water by stirring for one hour. Seven and one-half parts of starch was cooked in water at 30% solids to paste the starch. The starch was then stirred into the clay slip. Then 21 parts of a 36% by weight emulsion copolymer was added to the clay slip with stirring and adjusted to pH 8 with concentrated ammonium hydroxide. The coating colors, which contained 60% by weight total solids, were applied and tested in the manner described in Example XXV. The results are set forth in Table VI.

TABLE VI

| Pigment emulsion copolymer of Example | Percent by weight copolymer based on weight of clay | Starch [1] | Percent by weight starch based on weight of clay | Color viscosity, Brookfield in cps. | Color pH | Average IGT | Gardner gloss |
|---|---|---|---|---|---|---|---|
| I | 15 | None | | 202 | 8.0 | 380 | 24 |
| III | 15 | ___do___ | | 232 | 8.0 | 460 | 30 |
| VI | 15 | ___do___ | | 148 | 8.0 | 430 | 30 |
| I | 7.5 | Ethylex 2020 | 7.5 | 1,760 | 8.0 | 270 | 17 |
| III | 7.5 | ___do___ | 7.5 | 1,260 | 7.9 | 280 | 19 |
| VI | 7.5 | ___do___ | 7.5 | 1,180 | 8.2 | 370 | 17 |
| I | 7.5 | Stayco M | 7.5 | 2,520 | 8.2 | 270 | 12 |
| III | 7.5 | ___do___ | 7.5 | 2,400 | 8.0 | 230 | 15 |
| VI | 7.5 | ___do___ | 7.5 | 540 | 8.0 | 260 | 18 |
| I | 7.5 | Mira-Film 110 | 7.5 | 510 | 7.9 | 250 | 18 |
| III | 7.5 | ___do___ | 7.5 | 560 | 8.0 | 300 | 17 |
| VI | 7.5 | ___do___ | 7.5 | 360 | 8.1 | 170 | 20 |

[1] Ethylex 2020 is a hydroxyethyl starch. Stayco M is an alkaline-hypochlorite oxidized starch. Mira-Film 110 is a thin boiling starch acetate.

The data in Table VI indicates that part of the dissolved emulsion copolymer of Examples I, III or VI can be replaced with a starch pigment adhesive. However, the applied coating colors have lower IGT values and less gloss.

*Example XXVII*

This example illustrates the preparation of a coating color suitable for forming light weight paper wherein the pigment adhesive comprises 8% by weight of the mineral pigment. Four and two-tenths parts (dry weight) of an aqueous alkaline casein solution, which was prepared from 284 parts water, 50 parts casein and 2 parts sodium hydroxide, and 2 parts (dry weight) of a 25% by weight aqueous ammoniacal solution (pH about 8) of the emulsion copolymer of Example IX were added in order to 100 parts (wet weight) of a 70% by weight clay slip. The coating color was adjusted with water to 45% by weight total solids.

*Example XXVIII*

This example illustrates that coating colors based on the dissolved emulsion copolymer pigment adhesives of this invention can be employed at higher total solids than comparable coating colors based on polyvinyl alcohol in calendar stack coating procedures. Coating colors having the following compositions were prepared at 25% total solids:

| | Parts by weight (Dry) | |
|---|---|---|
| | A | B |
| Clay | 150 | 150 |
| Ethylex 2020 | 45 | 45 |
| Elvanol 7260 (polyvinyl alcohol) | 7.5 | 0 |
| Dissolved emulsion copolymer of Example XXIII | 0 | 7.5 |

The coating colors had the following Brookfield viscosities:

| Brookfield viscosity | A | B | B at 30% total solids |
|---|---|---|---|
| 10 r.p.m. #1 Spindle, cps | 300 | 50 | 130 |
| 20 r.p.m. #2 Spindle, cps | 160 | 40 | 95 |
| 100 r.p.m. #3 Spindle, cps | 36 | 15 | 91 |

Since many embodiments of this invention may be made and since many changes may be made in the embodiments described, the foregoing is to be interpreted as illustrative only, and our invention is defined by the claims appended hereafter.

We claim:

1. An aqueous paper coating color comprising as its principal dry components a major proportion of a mineral pigment and a minor proportion of a dispersion of a high molecular weight emulsion copolymer, comprising as its two essential monomers from 40 to 95 mole percent of an alkyl ester of an alpha, beta-ethylenically unsaturated monocarboxylic acid and from 5 to 50 mole percent of an alkyl half-ester of itaconic acid, wherein the total mole percent of said essential monomers is from 60 to 100 mole percent of said copolymer.

2. An aqueous alkaline paper coating color comprising as its principal dry components a major proportion of a mineral pigment and a minor proportion of a dissolved high molecular weight emulsion copolymer comprising as its two essential monomers from 40 to 95 mole percent of an alkyl ester of an alpha, beta-ethylenically unsaturated monocarboxylic acid, and from 5 to 50 mole percent of an alkyl half-ester of itaconic acid, wherein the total mole percent of said essential monomers is from 60 to 100 mole percent of said copolymer.

3. The composition of claim 2, wherein said copolymer comprises a soft alkyl ester of an alpha, beta-ethylenically unsaturated monocarboxylic acid, an alkyl half-ester of itaconic acid having from 4 to 8 carbon atoms in its alkyl group and a hard monomer.

4. The composition of claim 2, wherein the alkyl half-ester of itaconic acid comprises monomethyl itaconic acid and an alkyl half-ester of itaconic acid having from 4 to 8 carbon atoms in its alkyl group.

5. An aqueous alkaline paper coating color comprising as its principal dry components a major proportion of a mineral pigment and a minor proportion of a dissolved high molecular weight emulsion copolymer comprising from about 20 to 87 mole percent of soft alkyl ester of an alpha, beta-ethylenically unsaturated monocarboxylic acid, from about five to sixty mole percent of hard alkyl ester of an alpha, beta-ethylenically unsaturated monocarboxylic acid and from 8 to 20 mole percent of alkyl half-ester of itaconic acid having from one to 18 carbon atoms in its alkyl group, the total being 100 percent.

6. The composition of claim 5, wherein said copolymer comprises ethyl acrylate, methyl methacrylate and alkyl half-ester of itaconic acid having from four to eight carbon atoms in its alkyl group.

7. An aqueous coating color of claim 6, wherein said coating color comprises pasted starch.

8. A paper base coated with a dry composition comprising a major proportion of a mineral pigment and a minor proportion of a high molecular weight emulsion copolymer comprising as its two essential monomers from 40 to 95 mole percent of alkyl ester of an alpha, beta-ethylenically unsaturated monocarboxylic acid, and from 5 to 50 mole percent of alkyl half-ester of itaconic acid, wherein the total mole percent of said essential monomers is from 60 to 100 mole percent of said copolymer.

9. The article of claim 8, wherein said copolymer comprises a soft alkyl ester of an alpha, beta-ethylenically unsaturated monocarboxylic acid, an alkyl half-ester of itaconic acid having from 4 to 8 carbon atoms in its alkyl group and a hard monomer.

10. The article of claim 8, wherein the alkyl half-ester of itaconic acid comprises monomethyl itaconate and an alkyl half-ester of itaconic acid having from 4 to 8 carbon atoms in its alkyl group.

11. A paper base coated with a dry composition comprising a major proportion of a mineral pigment and a minor proportion of a high molecular weight emulsion copolymer comprising from about 20 to 87 mole percent of soft alkyl ester of an alpha, beta-ethylenically unsaturated monocarboxylic acid, from about 5 to 60 mole percent of hard alkyl ester of an alpha, beta-ethylenically unsaturated monocarboxylic acid and from 8 to 20 mole percent of alkyl half-ester of itaconic acid having from 1 to 18 carbon atoms in its alkyl group, the total being 100 percent.

12. The article of claim 11, wherein said copolymer comprises ethyl acrylate, methyl methacrylate and alkyl half-ester of itaconic acid, having from 4 to 8 carbon atoms in its alkyl group.

13. The article of claim 11, wherein said alkyl half-ester of itaconic acid has 4 carbon atoms in the alkyl group.

14. The article of claim 8, wherein said dry coating comprises starch.

15. A method of producing mineral coated paper which comprises coating at least one side of a paper sheet with an aqueous paper coating color comprising as its principal dry components a major proportion of a mineral pigment and a minor proportion of a dispersion of a high molecular weight emulsion copolymer comprising as its two essential monomers from 40 to 95 mole percent of an alkyl ester of an alpha, beta-ethylenically unsaturated monocarboxylic acid, and from 5 to 50 mole percent of an alkyl half-ester of itaconic acid, wherein the total mole percent of said essential monomers is from 60 to 100 percent of said copolymer, and drying the paper.

16. A method of producing mineral coated paper which comprises coating at least one side of a paper sheet with an aqueous paper coating color comprising as its principal dry components a major proportion of a mineral pigment and a minor proportion of a dissolved high molecular weight emulsion copolymer comprising as its two essential monomers from 40 to 95 mole percent of alkyl ester of an alpha, beta-ethylenically unsaturated monocarboxylic acid and from 5 to 50 mole percent of alkyl half-ester of itaconic acid, wherein the total mole persent of said essential monomers is from 60 to 100 mole percent of said copolymer, and drying the paper.

17. The process of claim 16, wherein said paper coating color is applied hot at the calendar stack.

18. The process of claim 17, wherein said copolymer comprises a soft alkyl ester of an alpha, beta-ethylenically unsaturated monocarboxylic acid, an alkyl half-ester of itaconic acid having from 4 to 8 carbon atoms in its alkyl group and a hard monomer.

19. The process of claim 18, wherein the alkyl half-ester of itaconic acid comprises monomethyl itaconate and an alkyl half-ester of itaconic acid having from 4 to 8 carbon atoms in its alkyl group.

20. A method of producing mineral coated paper which comprises coating at least one side of a paper sheet with a coating color comprising as its principal dry components a major proportion of a mineral pigment and a minor proportion of a dissolved high molecular weight emulsion copolymer comprising from about 20 to 87 mole percent of soft alkyl ester of an alpha, beta-ethylenically unsaturated monocarboxylic acid from about 5 to 60 mole percent of hard alkyl ester of an alpha, beta-ethylenically unsaturated monocarboxylic acid and from about 8 to 20 mole percent of alkyl half-ester of itaconic acid having from 1 to 18 carbon atoms in its alkyl group, the total being 100 percent and drying the paper.

21. The method of claim 20 wherein said copolymer comprises ethyl acrylate, methyl methacrylate and alkyl half-ester of itaconic acid, having from 4 to 8 carbon atoms in its alkyl group.

22. The method of claim 20 wherein said coating color comprises pasted starch.

References Cited by the Examiner

UNITED STATES PATENTS

| | | | |
|---|---|---|---|
| 2,790,736 | 4/1957 | McLaughlin | 260—86.1 |
| 3,037,881 | 6/1962 | McDowell | 260—29.6 |
| 3,081,198 | 3/1963 | Miller | 260—8 |

WILLIAM H. SHORT, *Primary Examiner.*

J. NORRIS, *Assistant Examiner.*